(12) United States Patent
Shah et al.

(10) Patent No.: US 10,820,176 B2
(45) Date of Patent: Oct. 27, 2020

(54) REMOTE USER EQUIPMENT ASSESSMENT FOR NETWORK CONNECTION PROVISIONING

(71) Applicants: AT&T Intellectual Property I, L.P., Atlanta, GA (US); Cricket Wireless LLC, Atlanta, GA (US)

(72) Inventors: Ronak Shah, Issaquah, WA (US); Judith Espejo, Snellville, GA (US); Yakun Gao, Suwanee, GA (US)

(73) Assignees: AT&T Intellectual Property I, L.P., Atlanta, GA (US); Cricket Wireless LLC, Atlanta, GA (US)

( * ) Notice: Subject to any disclaimer, the term of this patent is extended or adjusted under 35 U.S.C. 154(b) by 180 days.

(21) Appl. No.: 15/852,747

(22) Filed: Dec. 22, 2017

(65) Prior Publication Data
US 2019/0200160 A1 Jun. 27, 2019

(51) Int. Cl.
| | | |
|---|---|---|
| H04W 4/50 | (2018.01) | |
| H04L 12/24 | (2006.01) | |
| H04W 48/02 | (2009.01) | |
| H04W 76/10 | (2018.01) | |
| H04M 1/725 | (2006.01) | |
| H04W 12/08 | (2009.01) | |

(52) U.S. Cl.
CPC ............ *H04W 4/50* (2018.02); *H04L 41/082* (2013.01); *H04W 48/02* (2013.01); *H04W 76/10* (2018.02); *H04M 1/72525* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 7,817,988 | B2 | 10/2010 | Kruis et al. |
| 7,865,182 | B2 | 1/2011 | Macaluso |
| 8,494,510 | B2 | 7/2013 | Backholm |
| 8,767,931 | B2 | 7/2014 | Perfetto et al. |
| 8,798,577 | B2 | 8/2014 | Kruis et al. |
| 8,862,115 | B2 | 10/2014 | Macaluso |
| 9,019,897 | B2 | 4/2015 | Neill et al. |
| 9,479,923 | B2 | 10/2016 | Bajko |
| 2003/0182556 | A1* | 9/2003 | Sunder .................... G06F 21/10 713/176 |

(Continued)

*Primary Examiner* — Nasser M Goodarzi
*Assistant Examiner* — Terrika Peterson
(74) *Attorney, Agent, or Firm* — Hartman & Citrin LLC

(57) ABSTRACT

Concepts and technologies of remote user equipment assessment for network connection provisioning are provided herein. In an embodiment, a method can include receiving, by a server from a network connection client executing on a user equipment, a network connection request to authorize connection to a network. The method can also include determining, by the server, whether the user equipment can support communication via an internet protocol-based advanced service of the network. In response to determining that the user equipment can support communication with an internet protocol-based advanced service of the network, the method can further include authorizing, by the server, a network connection for the user equipment while prohibiting the user equipment from using the internet protocol-based advanced service during the network connection.

18 Claims, 5 Drawing Sheets

(56) References Cited

U.S. PATENT DOCUMENTS

| | | | |
|---|---|---|---|
| 2004/0177247 A1* | 9/2004 | Peles | H04L 63/08 |
| | | | 713/155 |
| 2007/0014243 A1 | 1/2007 | Meyer et al. | |
| 2007/0240197 A1* | 10/2007 | Blumenthal | H04L 63/0227 |
| | | | 726/1 |
| 2009/0025059 A1* | 1/2009 | Wang | H04W 80/045 |
| | | | 726/3 |
| 2010/0180016 A1* | 7/2010 | Bugwadia | G06F 9/4411 |
| | | | 709/220 |
| 2010/0192209 A1* | 7/2010 | Steeves | G06F 21/316 |
| | | | 726/7 |
| 2013/0343232 A1* | 12/2013 | Terpstra | H04M 3/567 |
| | | | 370/260 |
| 2015/0111565 A1 | 4/2015 | Urbanek | |
| 2016/0262007 A1* | 9/2016 | Mellqvist | H04W 76/10 |
| 2017/0041284 A1* | 2/2017 | Chen | H04L 61/103 |
| 2017/0118626 A1* | 4/2017 | Sadhu | H04W 8/183 |
| 2017/0325141 A1* | 11/2017 | Laliberte | H04W 12/06 |

* cited by examiner

REMOTE USER EQUIPMENT ASSESSMENT FOR NETWORK CONNECTION PROVISIONING

BACKGROUND

As mobile communication devices, such as smartphones and tablets, become more prevalent, many people use these devices as an aid for researching, working, communicating, and interacting with others. Conventionally, users would purchase mobile communication devices through a particular service provider. This would allow the communication service provider to know the settings, configuration, and capabilities of the devices prior to being purchased or used by the customer. In some instances, a particular model of mobile communication device would be manufactured in many different versions, such as one for each service provider that offers the particular mobile communication device. Conventionally, the customers may have purchased the mobile communication devices directly from the communication service provider. This may have required the customer to set up an individual account to use the mobile communication device with a wireless service provided by the communication service provider. However, many manufacturers may now also sell mobile communication devices through various vendors, such as mass retailers. As online market places become more prevalent, some people may purchase their mobile communication devices second hand, or from third party retailers. Irrespective of where the mobile communication device was purchased, some businesses may seek to lower costs by allowing their employees to bring their own devices to connect to a communication service, some of which may be unknown to the communication service provider that provides the communication service. Conventionally, the communication service provider may not have allowed such unknown devices to connect to a communications network.

SUMMARY

The present disclosure is directed to remote user equipment assessment for network connection provisioning. According to one aspect of the concepts and technologies disclosed herein, a method is disclosed. In some embodiments, the method can include providing, from a network, a network connection client to a distribution datastore for download and execution on a user equipment. The method can include receiving, by a server from a network connection client executing on a user equipment, a network connection request to authorize connection to a network. In some embodiments, the network connection request can include configuration information associated with the user equipment. In some embodiments, the configuration information of the network connection request can include a firmware identifier and an equipment identifier associated with the user equipment. The method also can include determining, by the server, whether the user equipment can support communication via an internet protocol-based advanced service of the network. In some embodiments, determining whether the user equipment can support communication with the internet protocol-based advanced service of the network is based on the configuration information. In response to determining that the user equipment can support communication with an internet protocol-based advanced service of the network, the method also can include authorizing, by the server, a network connection for the user equipment while prohibiting the user equipment from using the internet protocol-based advanced service during the network connection.

In some embodiments, the method can further include providing, by the server to a user interface of the user equipment via the network connection client, a network connection confirmation that includes a user prompt to inform a user that connection to the network has been authorized without functionality of the internet protocol-based advanced service. The method also can include creating a network connection authorization that instructs the network connection client to monitor for a change in firmware associated with the user equipment and for a user request to engage in the internet protocol-based advanced service via the network.

In some embodiments, the method also can include receiving, by the server from the network connection client, an indication of a change in the firmware associated with the user equipment. The method can include determining, by the server, whether the change in the firmware is approved to support connection with the network. The method can include creating, by the server based on determining whether the change in firmware is approved to support connection with the network, one of a command to authorize continued connection of the user equipment or a command to create a test request based on determining whether the change in firmware is approved to support connection with the network. In some embodiments, the method can include receiving, by the server from the network connection client, an indication of the user request to engage in the internet protocol-based advanced service via the network. The method can include restricting, by the server, the network from allowing the user equipment to engage in the internet protocol-based advanced service.

According to another aspect of the concepts and technologies disclosed herein, a system of remote user equipment assessment for network connection provisioning is disclosed. The system can include a processor and a memory. The memory can store computer-executable instructions that, when executed by the processor, cause the processor to perform operations. In some embodiments, the operations can include providing the network connection client to a distribution datastore for download and execution on the user equipment. The operations can include receiving, from a network connection client executing on a user equipment, a network connection request to authorize connection to a network. In some embodiments, the network connection request can include configuration information associated with the user equipment. In some embodiments, the configuration information of the network connection request includes a firmware identifier and an equipment identifier associated with the user equipment. The operations also can include determining whether the user equipment can support communication via an internet protocol-based advanced service of the network. In some embodiments, determining whether the user equipment can support communication with the internet protocol-based advanced service of the network is based on the configuration information. In response to determining that the user equipment can support communication with an internet protocol-based advanced service of the network, the operations also can include authorizing a network connection for the user equipment while prohibiting the user equipment from using the internet protocol-based advanced service during the network connection.

In some embodiments, the operations can include providing, to a user interface of the user equipment via the network connection client, a network connection confirmation that includes a user prompt to inform a user that connection to the network has been authorized without functionality of the internet protocol-based advanced service. The operations also can include creating a network connection authorization that instructs the network connection client to monitor for a change in firmware associated with the user equipment and for a user request to engage in the internet protocol-based advanced service via the network.

In some embodiments, the operations can include receiving, from the network connection client, an indication of a change in the firmware associated with the user equipment. The operations can include determining whether the change in the firmware is approved to support connection with the network. The operations also can include creating, based on determining whether the change in the firmware is approved to support connection with the network, one of a command to authorize continued connection of the user equipment or a command to create a test request. In some embodiments, the operations can include receiving, from the network connection client, an indication of the user request to engage in the internet protocol-based advanced service via the network. The operations can include restricting the network from allowing the user equipment to engage in the internet protocol-based advanced service.

According to yet another aspect, a computer storage medium is disclosed. The computer storage medium can have computer-executable instructions stored thereon. When the computer-executable instructions are executed by a processor, the processor can perform operations. In some embodiments, the operations can include receiving, from a network connection client executing on a user equipment, a network connection request to authorize connection to a network. In some embodiments, the network connection request can include configuration information associated with the user equipment. In some embodiments, the configuration information of the network connection request can include a firmware identifier and an equipment identifier associated with the user equipment. The operations can include determining whether the user equipment can support communication via an internet protocol-based advanced service of the network. In some embodiments, determining whether the user equipment can support communication with the internet protocol-based advanced service of the network is based on the configuration information. In response to determining that the user equipment can support communication with an internet protocol-based advanced service of the network, the operations also can include authorizing a network connection for the user equipment while prohibiting the user equipment from using the internet protocol-based advanced service during the network connection.

In some embodiments, the operations can include providing, to a user interface of the user equipment via the network connection client, a network connection confirmation that includes a user prompt to inform a user that connection to the network has been authorized without functionality of the internet protocol-based advanced service. The operations also can include creating a network connection authorization that instructs the network connection client to monitor for a change in firmware associated with the user equipment and for a user request to engage in the internet protocol-based advanced service via the network. In some embodiments, the operations can include receiving, from the network connection client, an indication of a change in the firmware associated with the user equipment. The operations can include determining whether the change in the firmware is approved to support connection with the network. The operations can include creating, based on determining whether the change in firmware is approved to support connection with the network, one of a command to authorize continued connection of the user equipment or a command to create a test request. In some embodiments, the operations can include receiving, from the network connection client, an indication of the user request to engage in the internet protocol-based advanced service via the network. The operations can include restricting the network from allowing the user equipment to engage in the internet protocol-based advanced service.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
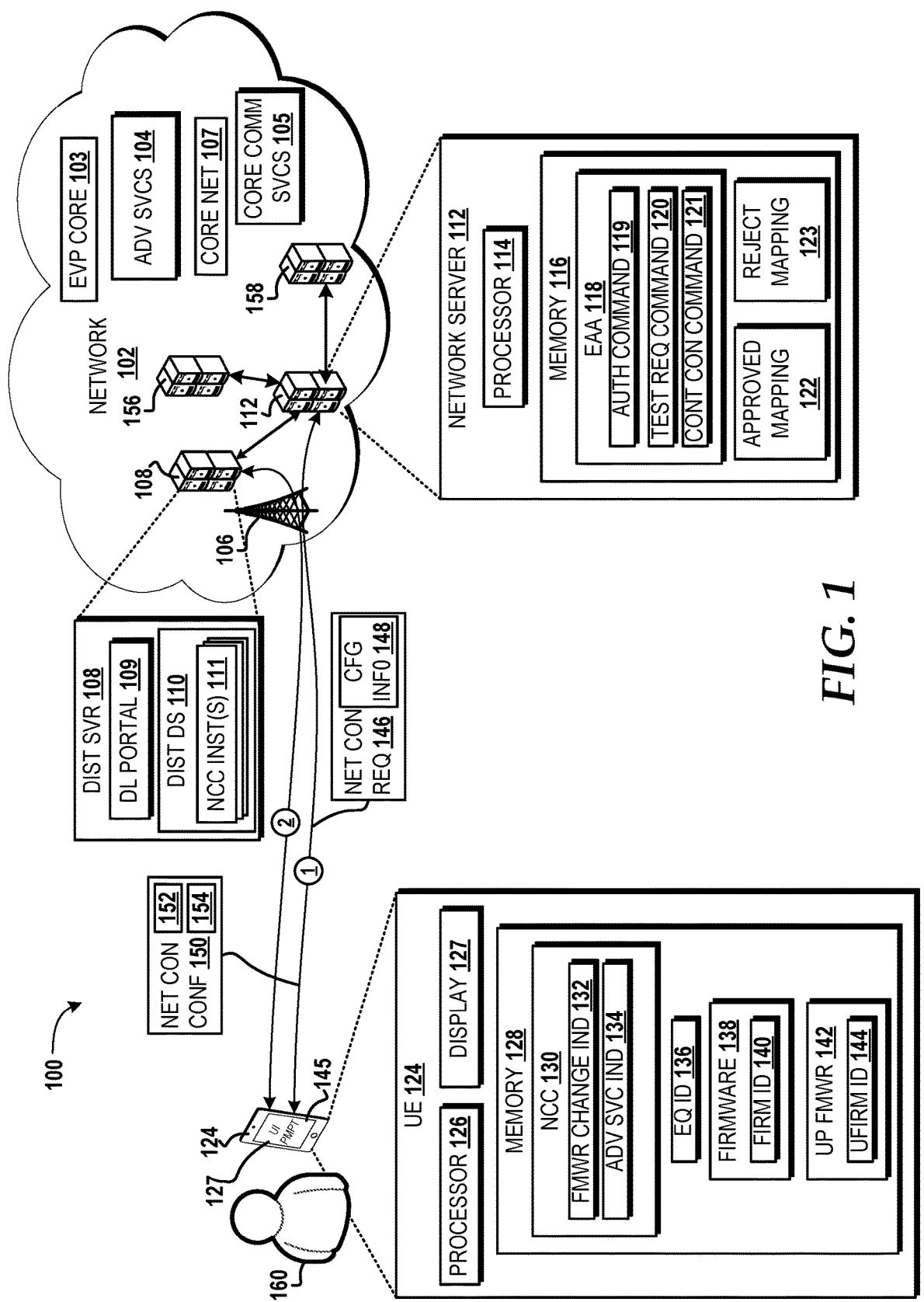
FIG. 1 is a system diagram illustrating an operating environment for providing remote user equipment assessment for network connection provisioning for various embodiments of the concepts and technologies described herein.

The following detailed description is directed to remote user equipment (UE) assessment for network connection provisioning. As the use of UEs, such as mobile communication devices, becomes more prevalent, users may purchase and/or otherwise obtain their UE through various retailers. In some instances, UEs are designed, sourced, and manufactured under the control of a single corporation and/or entity. However, this may not always be the case. In some instances, the design and sourcing of hardware and/or software incorporated within the UE may be provided by multiple corporations, engineering groups, manufacturers, or the like. Because some UEs are not associated with a single point of contact for the manufacturer, the communication service provider may be unsure of the software, firmware, and/or hardware versions currently residing on the UE. In some instances, a communication service provider may not have permissions to modify a configuration on the UE (e.g., may not have permission to modify or update firmware) of a potential customer that is seeking to obtain wireless communication service from the communication service provider. As communication service providers enhance the capabilities and services that are offered, the communication service provider may seek to retain the user for more than a temporary period, and thus seek to retain the user as a customer.

However, with the development and use of internet protocol (IP) to facilitate communication functions on the network of the communication service provider, some UEs may not be able to handle the current and/or future communication service features. For example, a network of a communication service provider can include IP-based advanced services that can support advanced voice and data functions. Examples of IP-based advanced services can include, but should not be limited to, internet multimedia subsystem (IMS) services (e.g., Voice over Long Term Evolution, Rich Communication Services (RCS) messaging, video calling, etc.), mobile hotspot and tethering, WiFi calling services, IP-based calls over unlicensed spectrum, carrier aggregation, spatial multiplexing, 5G, LTE-Advanced, LTE-Advanced Pro, or the like. In some instances, the IP-based advanced services can be provided using, for example without limitation, an internet protocol (IP) based network, an evolved packet core network, a circuit switched network, a radio access network, a combination thereof, or the like. Some non-IP based networks (e.g., 2G, 3G, a public service telephone network (PSTN), etc.) can use a voice bearer channel which can allow a network server of a communication service provider to determine when a voice call is in progress. However, IP-based networks can provide voice and/or data communications through a packet core, which can cause the network traffic to appear as data packets, thereby making it difficult for a network server to distinguish between voice calls and data communications. Thus, communication service providers may seek to ensure that a customer's UE can interact with the network and certain communication services (e.g., IP-based advanced services), thereby promoting a positive user experience.

Therefore, embodiments of the present disclosure can provide UE assessment for network connection provisioning that can facilitate setup and activation of a network connection on the network by determining whether the UE is capable of supporting IP-based advanced services. For example, a user may bring their own device to use in connecting to a network of a communication service provider. The UE may be directed to download a network connection client that executes on the UE to analyze and collect specific device information associated with hardware, software, and/or firmware of the UE. This information can be sent to a network server of the network that can maintain a mapping of the type of hardware, software, and/or firmware that is compatible or otherwise approved for use with one or more communication services in which the UE seeks to engage with the network. In some embodiments, the network server can communicate with a test server to identify combinations of hardware, software, and/or firmware that may cause faults or other network interruptions or conditions when the UE attempts to engage in network communications with the network. Various combinations can be approved or rejected based on any conflicts that are found if the UE were to connect to the network using the particular hardware, software, and/or firmware. The network server can use the mapping and information from the network connection client to inform a carrier provisioning system of the network to allow a network connection to occur. In some instances, the network connection may be subject to certain restrictions, such as the UE being excluded from one or more services from among the IP-based advanced services while connected to the network. The network connection client can monitor whether the UE attempts to engage in one or more of the IP-based advanced services, and if so, can deny the UE from using one or more of the IP-based advanced services. The network connection client also can inform the user (e.g., via a display of the UE) that the UE requires an upgrade to another communication service and/or the UE must be upgraded or updated before network connection can be made to engage in an advanced communication service and/or other communications services. In some embodiments, an IP-based advanced service may use and/or execute in cooperation and/or conjunction with a non-IP-based communication service to support certain setup and/or other network functions. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for UE assessment for network connection provisioning will be described, according to an illustrative embodiment. The operating environment 100 shown in FIG. 1 includes a communications network ("network") 102, an access point 106, a communication path 1, a distribution server 108, a distribution datastore 110, a communication path 2, a network server 112, a user equipment (UE) 124, a testing server 156, and a carrier provisioning system 158. In some embodiments, a communication service provider can operate within the network 102 to provide functionality in accordance with the concepts and technologies disclosed herein for network access to one or more network services, such as one or more IP-based advanced service(s) 104 and/or one or more core communications service(s) 105. The access point 106, the distribution server 108, the network server 112, the testing server 156, and the carrier provisioning system 158 can operate in communication with each other and/or as part of the network 102; however, this may not be the case in every embodiment. In some embodiments, the distribution server 108 can be operated by a cloud service provider, such as for distributing content through a remote cloud platform. It is understood that the examples provided here are for illustration purposes only, and therefore should not be construed as limiting in any way.

The network 102 can be supported by one or more compute resources, memory resources, and/or other resources. For example, the compute resource(s) can include one or more particular hardware devices that perform computations to process data, and/or to execute computer-executable instructions of one or more application programs, operating systems, and/or other software, including applications that provide, at least in part, the IP-based advanced service 104 and/or the core communications service 105. The compute resources can include one or more central processing units ("CPUs") configured with one or more processing cores, and/or one or more graphics processing unit ("GPU") configured to accelerate operations performed by one or more CPUs. The compute resources can include one or more system-on-chip ("SoC") components along with one or more other components, including, for example, one or more of the memory resources, and/or one or more of the other resources. The memory resource(s) can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources. The other resource(s) can include one or more hardware and/or virtual resources, one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like. In some embodiments, the compute resources, the memory resources, and/or the other resources can collectively function to enable network traffic across the network 102 so as to support communication services for user equipment. Additional details of aspects of the network 102 are illustrated and described below with reference to FIG. 3.

In some embodiments, the network 102 can provide various communication services, such as the IP-based advanced service 104 and/or the core communications service 105. The IP-based advanced service 104 and the core communications service 105 can be supported by the compute resources, memory resources, and/or other resources of the network 102, such as described above. In some embodiments, the core communications service 105 can allow a UE (e.g., the UE 124) to communicatively couple to the network 102 to engage in voice communications calls (e.g., through a non-IP-based call connection, such as 2G, 3G, and/or a PSTN) and/or data communications (e.g., accessing the internet, sending messages via a short message service, accessing email, etc.). In some embodiments, the network 102 may limit customers who desire to use the network in a "pre-paid" model and/or "pay-as-you-go" model (where the customer pays in advance for an allocated amount of data usage and/or call usage based on minutes of voice communications, compared to a "post-paid" model where customers are charged after services are used and/or on a periodic basis) to use the core communications service 105 and, in some embodiments, a limited number of advanced services from the IP-based advanced service 104. In some embodiments, the core communications service 105 may allow the UE 124 to engage in calls over the network that do not involve one or more aspects of the IP-based advanced service 104, such as advanced communication services. The IP-based advanced service 104 may be considered as an "advanced communication service" because the IP-based advanced service 104 can support operations that go beyond the functionality of the core communications service 105. For example, in some embodiments, in addition to all of the services included with the core communication service 105, the IP-based advanced service 104 can provide advanced services, such as but not limited to, Voice over Long Term Evolution (VoLTE) calling, Wi-Fi calling, Rich Communications Systems (RCS) protocol for voice and messaging, video calling, mobile hotspots, wireless tethering, active nuisance protection (e.g., spam monitoring to block and/or screen nuisance calls), a combination thereof, or the like. It is understood that examples provided above are for illustration purposes only, and therefore should not limit the scope of the disclosure in any way. It should be understood that, as used herein, the term "service," and variations thereof, refers to network hosted operations and executed functions that can allow one or more UE to interact with the network 102 and/or other network devices, and when used in the claims, does not include abstract concepts, but rather is directed only to the technical computing realm.

The network 102 can include a radio access network, an evolved packet core network, a core network, an IP-based network, a circuit switched network, a mobile a Wide Area Network, and/or a combination thereof. In some embodiments, the network 102 also can include an evolved packet core network 103 and a core network 107. In some embodiments, the evolved packet core network (EVP core) 103 and the core network 107 can operate to as a part of the network 102. In some embodiments, the network 102 can include a radio access network that supports the access point 106, and the evolved packet core network 103 and the core network 107 can communicatively couple to the radio access network in order to communicate with a UE, such as the UE 124. The evolved packet core network 103 may be used to support the IP-based advanced service 104; however, this may not be the case in all embodiments. It is understood that in some embodiments, other network entities and/or portions of the network 102 may be used to support the IP-based advanced service 104, such that when customers would like to subscribe to and use advanced services (e.g., Voice over LTE and/or WiFi calling discussed above), the network 102 assigns the customer's UE to use various elements of the network to support the functionality of the IP-based advanced service 104. The core network 107 may support the core communication services 105 such that when customers seek to use their UE to engage in voice communications calls through a non-IP based call connection (e.g., 2G, 3G, and/or a PSTN) and/or data communications (e.g., accessing the internet, sending messages via a short message service, accessing email, etc.), the network 102 assigns the customer's UE to use the core network 107 to engage in the core communication services 105. In some embodiments, the core network 107 can operate in cooperation and/or in conjunction with a circuit switched network so as to support one or more of the IP-based advanced service 104 and/or the core communication service 105.

The network 102 can include one or more access points 106 that can facilitate communicative coupling between the UE 124 and network 102. Although one instance of the access point 106 is illustrated in FIG. 1, it is understood that multiple instances of the access point 106 can be included in various embodiments. The access point 106 can provide wired and/or wireless communicative coupling and can include a base station, a wireless router, a femtocell, an eNode B, a NodeB, a gNode B (i.e., an access point that incorporates new radio access technology, such as LTE-Advanced and other 5G technology) and/or other network nodes that can facilitate communication between the UE 124 and the network 102. As illustrated in FIG. 1, the communication path 1 and the communication path 2 are shown as traversing through the access point 106, however this may not be the case in all embodiments. In some embodiments, the access point 106 can provide the communication path 1 to allow communicative coupling with the UE 124, while another access point (not shown) can provide the communication path 2 to allow the UE 124 to communicatively couple with the distribution server 108, or vice-versa. In some embodiments, more than one access point can be implemented to facilitate the communication path 1 and/or the communication path 2. Therefore, the examples provided are for illustration purposes only, and should not be construed as limiting in any way.

The network 102 can include one or more instances of the network server 112. The network server 112 can include a processor 114 and a memory 116 that stores an equipment assessment application (EAA) 118. The processor 114 can include a central processing unit, a graphics processing unit, a system-on-chip circuit, and/or other compute resources that can be configured upon execution to perform operations discussed herein. The memory 116 can provide temporary and/or permanent storage operations, and can include volatile and/or non-volatile memory that can be implemented in any method or technology for storage of information such as computer-readable instructions, data structures, program modules, or other data disclosed herein. The memory 116 can include computer storage media such as, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the processor 114. The EAA 118 can include computer-readable instruction, data structures, program modules, and/or other data that can configure the network server 112 to perform operations upon execution. One or more instances of the EAA 118 can reside within the network 102 and function to interact with one or more UEs (e.g., the UE 124), the distribution server 108, the testing server 156, and/or the carrier provisioning system 158. In some embodiments, the carrier provisioning system 158 can include, and/or operate in conjunction with, a Home Location Register (HLR), a Home Subscriber Server (HSS), a carrier billing platform and/or service, a combination thereof, or the like. Further details about the EAA 118 will be discussed below.

In some embodiments, the network 102 can include the distribution server 108. In other embodiments, the distribution server 108 can be communicatively coupled to the network 102 and be hosted by a third-party network that is external to the network 102. The distribution server 108 can host and/or otherwise support a download portal 109 and the distribution datastore 110. In some embodiments, the network server 112 may provide the distribution datastore 110 with one or more network connection client (NCC) instances 111. In an embodiment, the UE 124 can access, such as via a WiFi connection, the download portal 109 hosted by the distribution server 108 to obtain one of the NCC instances 111. In some embodiments, the communication path 1 and/or the communication path 2 can provide the WiFi connection used to access the download portal 109. The distribution datastore 110 includes memory that can store the one or more NCC instances 111 for download, installation, and execution on a UE, such as the UE 124. For example, when a customer would like to engage in a communication service with the network 102 (e.g., one or more of the IP-based advanced service 104 and/or the core communications service 105), the UE 124 may be informed by the network 102 to first obtain one of the NCC instances 111 from the distribution server 108. The customer can use the UE 124 to download one of the NCC instances 111, which is illustrated as the NCC 130 of the UE 124 in FIG. 1. It is understood that the NCC 130 may be copy of one of the NCC instances 111, and the NCC instances 111 may be retained in storage on the distribution datastore 110 in order to be provided to other UEs that access the download portal 109. In some embodiments, the NCC 130 must remain installed on the UE 124 for as long as the customer intends to use a particular communication service of the network 102, such as when using the core communications service 105. Once installed on the UE 124, the NCC 130 can execute in the background of the UE 124 to facilitate assessment of hardware, software, and/or firmware associated with the UE 124, which will be discussed in further detail below.

The operating environment 100 can include one or more instances of the UE 124. In some embodiments, the UE 124 may be associated with a user 160. The UE 124 can include a processor 126 that provides compute resources, and a memory 128 that provides temporary and/or permanent storage operations. The UE 124 also can include a display 127 that can present a user interface 145. In some embodiments, the display 127 can be configured to receive input from the user 160. In some embodiments, the memory 128 and/or other hardware of the UE 124 can store an equipment identifier 136 that can indicate an identification of one or more aspects of the UE 124. For example, in some embodiments, the equipment identifier 136 can include, but should not be limited to, a mobile equipment identifier (MEI), an international mobile equipment identity (IMEI), a Type Allocation Code (TAC), an electronic serial number, original equipment manufacturer identity, or a combination thereof. The UE 124 may also include firmware 138 that can be executed and operate in conjunction with an operating system to control hardware and facilitate operations of the UE 124. In some instances, the firmware 138 can be changed, altered, reinstalled, and/or updated, which is represented in FIG. 1 as the updated firmware 142. In some embodiments, the firmware 138 can have a firmware identifier 140 that can indicate a version number and/or unique firmware identity associated with the firmware 138. Similarly, in some embodiments, the updated firmware 142 can include an updated firmware identifier 144 associated with the updated firmware 142. In some embodiments, the updated firmware 142 may be referred to as "a change to the firmware 138" and/or a "modified" or "altered" firmware. In some embodiments, instances of firmware (e.g., any of the firmware 138 and/or the updated firmware 142) can include a file and/or segment of executable instructions that is loaded into at least a portion of the memory 128 available on the UE 124, such as but not limited to flash memory. The updated firmware 142 is intended to refer to a full and/or partial instance of firmware that is stored on the UE 124 as a replacement of, and/or supplement to, the firmware 138. When the UE 124 has the firmware 138 loaded thereon, the firmware identifier 140 may be made available for retrieval. In some embodiments, when the updated firmware 142 is loaded onto the UE 124, the updated firmware identifier 144 is made available for retrieval. In some embodiments, the firmware identifier 140 may no longer be available for retrieval due to the firmware 138 being replaced with the updated firmware 142. In some embodiments, the firmware identifier 140 may remain available for retrieval in the memory 128 (irrespective of whether the firmware 138 has been deleted, overwritten, replaced, or supplemented with the updated firmware 142) in order to provide a firmware history for the UE 124. It is understood that the examples provided are for illustration purposes only, and therefore should not be construed as limiting in any way.

The communication service provider associated with the network 102 may offer customers (e.g., the user 160) the opportunity to sign-up for a communication service (e.g., one or more of the IP-based advanced service 104 and/or the core communications service 105) of the network 102. In some instances, the user 160 may decide to bring their own device for use in communicative coupling with the network 102, such as the UE 124. In some embodiments, the communication service provider may refer to this as "Bring Your Own Device" (BYOD). In some embodiments, when the UE 124 is a BYOD, the network 102 may not have previously provided communication services to the UE 124 and may not know information about the UE 124. Thus, when the UE 124 seeks to engage in a communication service with the network 102 (e.g., via one or more of the IP-based advanced service 104 and/or the core communications service 105), the UE 124 may be directed to the download portal 109 to obtain an NCC instance from the NCC instances 111, which can be downloaded and installed on the UE 124 as the NCC 130. By using the NCC 130, the network server 112 can determine whether the UE 124 is capable of engaging in both the IP-based advanced services 104 (e.g., through the evolved packet core network 103) and the core communication services 105 (e.g., through the core network 107).

The NCC 130 can be stored in the memory 128 and may be granted permissions to execute at an application layer (i.e., layer seven as referenced in the open systems interconnection (OSI) model). In some embodiments, the NCC 130 may be granted permission by the user 160 to execute at a session layer of the UE 124, which corresponds with layer five as referenced in the OSI model. The NCC 130 may execute at the session layer of the UE 124 in order to allow for communication session monitoring and identifying of the type and nature of connections that the UE 124 is attempting to engage, such as attempts to engage in communications related to the IP-based advanced services 104. As such, the NCC 130 may execute in the background of the UE 124. In some embodiments, the NCC 130 may be given permission to access one or more application programming interface (API) of applications on the UE 124, thereby further enabling the NCC 130 to collect identifying information (e.g., configuration information 148) about hardware, software, and/or firmware on the UE 124 that may cause processing faults, network interruptions, and/or other unauthorized communications to occur should the UE 124 attempt to engage in IP-based advanced services (e.g., Voice over LTE and/or WiFi calling) using the core network 107 instead of a portion of the network associated with facilitating IP-based communications, such as but not limited to, the evolved packet core network 103.

Once installed in the memory 128 of the UE 124, the NCC 130 may monitor, analyze, and/or collect identifying information about the hardware, software, and/or firmware of the UE 124. For example, in some embodiments, the NCC 130 can collect configuration information 148 about the UE 124. The configuration information 148 can include the firmware identifier 140 and/or the equipment identifier 136 associated with the UE 124. The NCC 130 can create a network connection request 146 that includes the configuration information 148 that is associated with the hardware, software, and/or firmware of the UE 124. In some embodiments, the network connection request 146 can be associated with the UE 124 that seeks to engage in communication services associated with a pre-paid and/or post-paid subscription model (where some and/or all services of the IP-based advanced services 104 may be offered only through the post-paid subscription model). The NCC 130 can send the network connection request 146 to the network server 112 in order to determine the capabilities of the UE 124. After sending the network connection request 146, in some embodiments, the NCC 130 can monitor the UE 124 for changes to any hardware, software, and/or firmware of the UE 124. For example, in some embodiments, the network connection request 146 may have included the firmware identifier 140 associated with the firmware 138. At some time after sending the network connection request 146, the UE 124 may receive updated firmware 142, such as part of an update from the manufacturer of the UE 124. The updated firmware 142 can have an updated firmware identifier, such as the updated firmware identifier 144. In some embodiments, the NCC 130 can collect the updated firmware identifier 144 and inform the network server 112 of the updated firmware identifier 144. In some embodiments, the NCC 130 may detect that the firmware 138 is being deleted from the UE 124. In this scenario, the NCC 130 may save the firmware identifier 140 so that both the firmware identifier 140 and the updated firmware identifier 144 can be sent to the network server 112, thereby providing a history of the various firmware instances installed on the UE 124.

In some embodiments, the network server 112 can execute the EAA 118 that is configured to interact with the NCC 130 of the UE 124. In some embodiments, the UE 124 may seek to subscribe to the core communication services 105, which does not offer and/or allow the UE 124 to engage in services provided by the IP-based advanced services 104 (e.g., Voice over LTE, WiFi calling, mobile hotspots, or the like). However, the EAA 118 may seek to determine whether the UE 124 can support engaging in the services provided by the IP-based advanced services 104, despite the UE 124 requesting use of the core communication services 105 and not currently requesting use of the IP-based advanced services 104. The identification as to whether the UE 124 is capable of engaging in a service of the IP-based advanced services 104 (despite not signing up for the IP-based advanced services 104) can reduce network communication faults at a later time should the user 160 choose to subscribe to the IP-based advanced services 104 and retain their UE 124 to do so. Thus, the UE 124 can send the network connection request 146 to the network server 112. The EAA 118 executing on the network server 112 can receive the network connection request 146 from the NCC 130. The EAA 118 can determine the capabilities of the UE 124 based on information contained in the network connection request 146. For example, in some embodiments, the EAA 118 can analyze the configuration information 148 contained in the network connection request 146, such as the equipment identifier 136 and/or the firmware identifier 140. The EAA 118 can determine whether the UE 124 has hardware, software, and/or firmware to support the use of certain network services, such as communicating via the IP-based advanced services 104. To determine whether the UE 124 is capable of engaging in the IP-based advanced services 104, the EAA 118 can compare the configuration information 148 with an approved mapping 122 and/or a reject mapping 123 that can be stored in the memory 116 of the network server 112. In some embodiments, the approved mapping 122 can map a combination of an equipment identifier (associated with at least one particular UE, such as the equipment identifier 136 associated with the UE 124) and a firmware identifier (associated with particular versions and/or instances of firmware, such as the firmware identifier 140) to one or more communication services (e.g., the IP-based advanced services 104) to indicate whether the particular firmware executing on a particular type of UE has been tested and is known not to cause any faults and not to have software and/or hardware defects (i.e., operational, processing, and/or communication issues) that could cause interruptions and/or failed connections with network 102 for specific communication services (e.g., the IP-based advanced services 104).

In some embodiments, the approved mapping 122 can provide a range of equipment identifiers (e.g., a range of International Mobile Equipment Identities (IMEIs), a range of Type Allocation Codes (TACs), or another range of equipment identifiers discussed herein) and firmware identifiers, and can indicate whether a particular combination of an equipment identifier and firmware identifier (falling within the respective equipment identifier range and firmware identifier range) has been tested by the testing server 156 and is considered to be approved for use on the network 102 (i.e., the combination is not known to cause network faults with a portion of the network 102, such as the evolved packet core network 103 and the core network 107). In some embodiments, the approved mapping 122 can provide a range of known equipment identifiers, such as a range of IMEIs and/or TACs that have been tested by the testing server 156. In some embodiments, the EAA 118 may use the approved mapping 122 to identify whether an equipment identifier is within the range of known equipment identifiers, and if so, then check whether the combination of the equipment identifier and the firmware identifier are approved to use the IP-based advanced services 104. In some embodiments, the EAA 118 can also use the reject mapping 123 to determine whether the equipment identifier 136 and/or the firmware identifier 140 is known to cause problems should the UE 124 use (or attempt to use) one or more of the core communication services 105 and/or the IP-based advanced services 104.

The reject mapping 123 can identify whether an equipment identifier (or a range of equipment identifiers) and/or a firmware identifier (or a range of firmware identifiers) have been tested and are considered not to be approved for use on the network 102. In some embodiments, if an equipment identifier (e.g., the equipment identifier 136) and/or a firmware identifier (e.g., the firmware identifier 140) is not found within the approved mapping 122 and not found within the reject mapping 123, the EAA 118 may determine that the UE, the firmware, or a combination thereof, has not been tested by the testing server 156 to determine whether network faults could (or have been shown to) occur during communication with the network 102. For example, in some embodiments, if a particular firmware identifier and equipment identifier appears on the reject mapping 123, then the associated UE may not be able to function (and/or cause network faults to occur) with the core communication services 105 and/or the IP-based advanced services 104. In some embodiments, the particular firmware identifier and equipment identifier may be found on the approved mapping 122, however, in some embodiments, the approved mapping 122 may indicate that the combination of equipment identifier and firmware identifier (falling within a range of equipment identifiers and a range of firmware identifiers) is approved for use with only the core communication services 105 of the core network 107. This may be because the testing server 156 has conducted network communication tests and determined that UEs having an equipment identifier and firmware identifier within a specific equipment identifier range and firmware identifier range, respectively, cannot engage in services offered by the IP-based advanced services 104 (e.g., cannot participate in Voice over LTE calls, WiFi calls, mobile hotspots, etc.). In some embodiments, if a UE assigned to use only the core communication services 105 of the core network 107 then attempts to engage in one or more services offered by the IP-based advanced services 104 (e.g., Voice over LTE, WiFi calling, mobile hotspots, etc.), the attempt can be denied by the carrier provisioning system 158. In some embodiments, if a particular UE has an equipment identifier and/or a firmware identifier that is included in the reject mapping 123, the EAA 118 can inform the user 160 (via the NCC 130 presenting the user interface 145 on the display 127) that the UE may need to be updated (e.g., by installation of new firmware) and/or upgraded (e.g., a new UE needs to be purchased) before being allowed to engage in one or more communication services (e.g., services offered by the IP-based advanced services 104).

The EAA 118 can determine whether the UE 124 can support engaging in network communications and services offered by the IP-based advanced services 104 based on the configuration information 148 and analysis of the approved mapping 122 and/or the reject mapping 123. For example, in some embodiments, the equipment identifier 136 can provide an IMEI and/or a TAC and the firmware identifier 140 can correspond with the firmware 138 currently installed on the UE 124. The EAA 118 can access the approved mapping 122 to determine whether the equipment identifier 136 is within a known range (i.e., falls within a range of equipment identifiers). In an embodiment in which the equipment identifier 136 does not fall within a known range of equipment identifiers, the EAA 118 can create a test request command 120 that instructs the testing server 156 to use the combination of the equipment identifier 136 and the firmware identifier 140 to check whether network faults would occur and/or whether advanced services provided by the IP-based advanced service 104 could be supported using the combination. In this embodiment, if the testing server 156 determines that network faults would occur and/or that the UE associated with the combination of the equipment identifier and the firmware identifier cannot support one or more of the IP-based advanced services 104, then the testing server 156 can instruct the EAA 118 to update the reject mapping 123 with the combination of the equipment identifier and firmware identifier that causes faults and/or is not approved to engage in the advanced services of the IP-based advanced services 104. Alternatively, in another embodiment, if the combination of the equipment identifier and the firmware identifier is approved (i.e., does not cause network faults and/or can engage in services provided by the IP-based advanced services 104), then the testing server 156 can instruct the EAA 118 to update the approved mapping 122.

In some embodiments, the EAA 118 can determine, based on the equipment identifier and the firmware identifier being approved within the approved mapping 122, that the UE 124 can support engaging in services provided by the IP-based advanced services 104, that may in some embodiments be routed through the evolved packet core network 103. In some embodiments, the EAA 118 can provide authorization to the carrier provisioning system 158 to allow the UE 124 to engage in a network connection with the core communication services 105. In some embodiments, the EAA 118 may limit and/or prohibit the UE 124 from using and/or otherwise engaging in use of the IP-based advanced services 104 (including prohibiting use of a network connection that would permit use of services offered by the IP-based advanced services 104, such as Voice over LTE, WiFi calling, etc.). In some embodiments, the EAA 118 can create an authorization command 119 that can be sent to the carrier provisioning system 158 to indicate that the UE 124 is authorized to use the core communication services 105 and prohibited from engaging in functionality of the IP-based advanced services 104 (e.g., prohibited from engaging in one or more of Voice over LTE, WiFi calling, etc.) despite the UE 124 being capable of engaging in the services of the IP-based advanced services 104. In some embodiments, the EAA 118 may allow the UE 124 to engage in a limited set of services from the IP-based advanced services 104 (e.g., only Voice over LTE) while prohibiting the use of other services (e.g., RCS) because the EAA 118 may have determined that firmware 138 of the UE 124 may not support (and/or cause network faults with) one or more advanced services of the IP-based advanced services 104.

In some embodiments, the EAA 118 can create a network connection confirmation 150 that can be sent to the NCC 130 of the UE 124. In some embodiments, the network connection confirmation 150 can include a user prompt 152 and a network connection authorization 154. The user prompt 152 can be presented on the user interface 145 of the display 127 to inform the user 160 that connection to the network 102 has been authorized. In some embodiments, the user prompt 152 can indicate that the connection to the network 102 has been authorized to use the core communications services 105 but without functionality of the IP-based advanced services 104. In some embodiments, the user prompt 152 can indicate that the connection to the network 102 has been authorized with limited functionality to the IP-based advanced services 104, such as authorization only to use a particular IP-based advanced service, such as Voice over LTE calling. In some embodiments, the NCC 130 can be instructed to monitor for a change in the firmware 138 and to create a firmware change indication 132 if the NCC 130 detects that the UE 124 has changed or otherwise altered the firmware 138 residing in the memory 128. In some embodiments, the network connection authorization 154 also can instruct the NCC 130 of the UE 124 monitor for a user request to engage in one or more advanced services of the IP-based advanced service 104, and to create an advanced services indication 134 if the NCC 130 detects that the UE 124 is attempting to engage in one or more advanced services of the IP-based advanced services 104, such as Voice over LTE, WiFi calling, mobile tethering, or the like.

Based on the network connection confirmation 150, the NCC 130 can monitor for changes in the firmware 138 and/or attempts to engage in advanced services associated with the IP-based advanced services 104, which may collectively be referred to as a "monitor mode" of the NCC 130. For example, in some embodiments, the NCC 130 can detect that updated firmware 142 has been installed on the memory 128, where the updated firmware 142 may replace and/or supplement the firmware 138 that was previously installed on the UE 124. The NCC 130 can determine that the updated firmware 142 is not the same as the firmware 138 based on an updated firmware identifier associated with the updated firmware 142 being different from the firmware identifier associated with the firmware 138. The NCC 130 can create the firmware change indication 132 that includes the updated firmware identifier 144 associated with the updated firmware 142. In some embodiments, the firmware change indications 132 can also include the identity of the previously installed firmware, which in this example is the firmware identifier 140 associated with the firmware 138. The NCC 130 can send the firmware change indication 132 to the EAA 118 of the network server 112. The EAA 118 can receive the firmware change indication 132 and determine whether the updated firmware 142 is approved to support connection with the network 102. In some embodiments, the EAA 118 can determine whether the updated firmware 142 is approved to support one or more services provided by the IP-based advanced services 104, even if the UE 124 is currently authorized only to use the core communications services 105.

In some embodiments, the EAA 118 can create a command based on determining whether the updated firmware 142 is approved to support the connection with the network 102, such as approved to use one or more services of the IP-based advanced services 104. For example, in some embodiments, the EAA 118 can create a continued connection command 121 that authorizes the continued connection of the UE 124 to the network 102, such as the continued use of the core communications services 105 and/or the IP-based advanced services 104. In some embodiments, the continued connection command 121 can be created based on the updated firmware 142 being approved for use on the network 102, which the EAA 118 can determine based on the combination of the updated firmware identifier 144 and the equipment identifier 136 being identified as approved within the approved mapping 122. In some embodiments, if the EAA 118 cannot identify whether the updated firmware identifier 144 and the equipment identifier 136 have been approved (i.e., is not shown as being approved in the approved mapping 122), then the EAA 118 can create a test request command 120 that instructs the testing server 156 to determine whether the updated firmware 142 of the UE 124 will cause the network 102 any malfunctions and/or cause the UE 124 to experience any network connection issues (e.g., failed network connection attempts, poor reception, etc.) which may also cause errors to occur within one or more of the core communication services 105 and/or the IP-based advanced services 104.

In some embodiments, the NCC 130 can receive the advanced services indication 134 that can indicate that the UE 124 is attempting to engage in one or more advanced services of the IP-based advanced service 104, such as Voice over LTE, WiFi calling, mobile tethering, RCS, or the like. The EAA 118 may determine whether the UE 124 is authorized to use the one or more IP-based advanced service since the UE 124 may have been initially authorized only to engage in communications using the core communication services 105 (of which services from the IP-based advanced service 104 are not included) and/or only engage in particular services from the IP-based advanced services 104 while being prohibited from engaging in all services of the IP-based advanced services 104. If the EAA 118 determines that the UE 124 is not authorized to engage in the IP-based advanced services that were attempted to be used, then the EAA 118 can prevent the UE 124 from using the one or more IP-based advanced services 104 by restricting the network 102 from allowing a network connection with the UE 124 to occur. For example, in some embodiments, the EAA 118 can instruct the carrier provisioning system 158 to deny the UE 124 a network connection that attempts to route network traffic through a portion of the network 102 (e.g., an IP core, the evolved packet core network 103, etc.) to engage or otherwise use the IP-based advanced services 104. The EAA 118 may provide the equipment identifier 136 associated with the UE 124 to the carrier provisioning system 158 so that the carrier provisioning system 158 can identify if and/or when the UE 124 attempts to connect to a portion of the network 102 (e.g., the evolved packet core network 103) to use the one or more services of the IP-based advanced service 104 of which the UE 124 is not authorized to engage. As such, the EAA 118 can effectively enable and/or disable, via the network domain of the network 102, the ability of the UE 124 to engage in IP-based advanced services, irrespective of whether the EAA 118 and/or the NCC 130 has permissions to alter any settings, configurations, software, and/or firmware of the UE 124. In some embodiments, the EAA 118 can provide a message to the UE 124 that informs the user 160 that an upgrade to a subscription that includes the IP-based advanced services 104 is available based on the equipment identifier 136 and the updated firmware identifier 144 and/or the firmware identifier 140 being approved on the approved mapping 122. In some embodiments, the user 160 can provide input that authorizes the upgrade from the core communications services 105 to full use of the IP-based advanced services 104.

It is understood that zero, one, or more than one instance of the network 102, the evolved packet core network 103, the IP-based advanced services 104, the core communication services 105, the core network 107, the access point 106, the communication path 1, the communication path 2, the distribution server 108, the download portal 109, the distribution datastore 110, the NCC instances 111, network server 112, the processor 114, the memory 116, the EAA 118, the commands 119-121, the approved mapping 122, the reject mapping 123, the UE 124, the processor 126, the memory 128, the NCC 130, the indications 132, 134, the equipment identifier 136, the firmware 138, the firmware identifier 140, the updated firmware 142, the updated firmware identifier 144, the user interface 145, the display 127, the network connection request 146, the configuration information 148, the network connection confirmation 150, the user prompt 152, the network connection authorization 154, the testing server 156, the carrier provisioning system 158, and the user 160 can be included within the operating environment 100 shown in FIG. 1. As such, the illustrated embodiment should be understood as being illustrative, and should not be construed as being limiting in any way.

Figure 2:
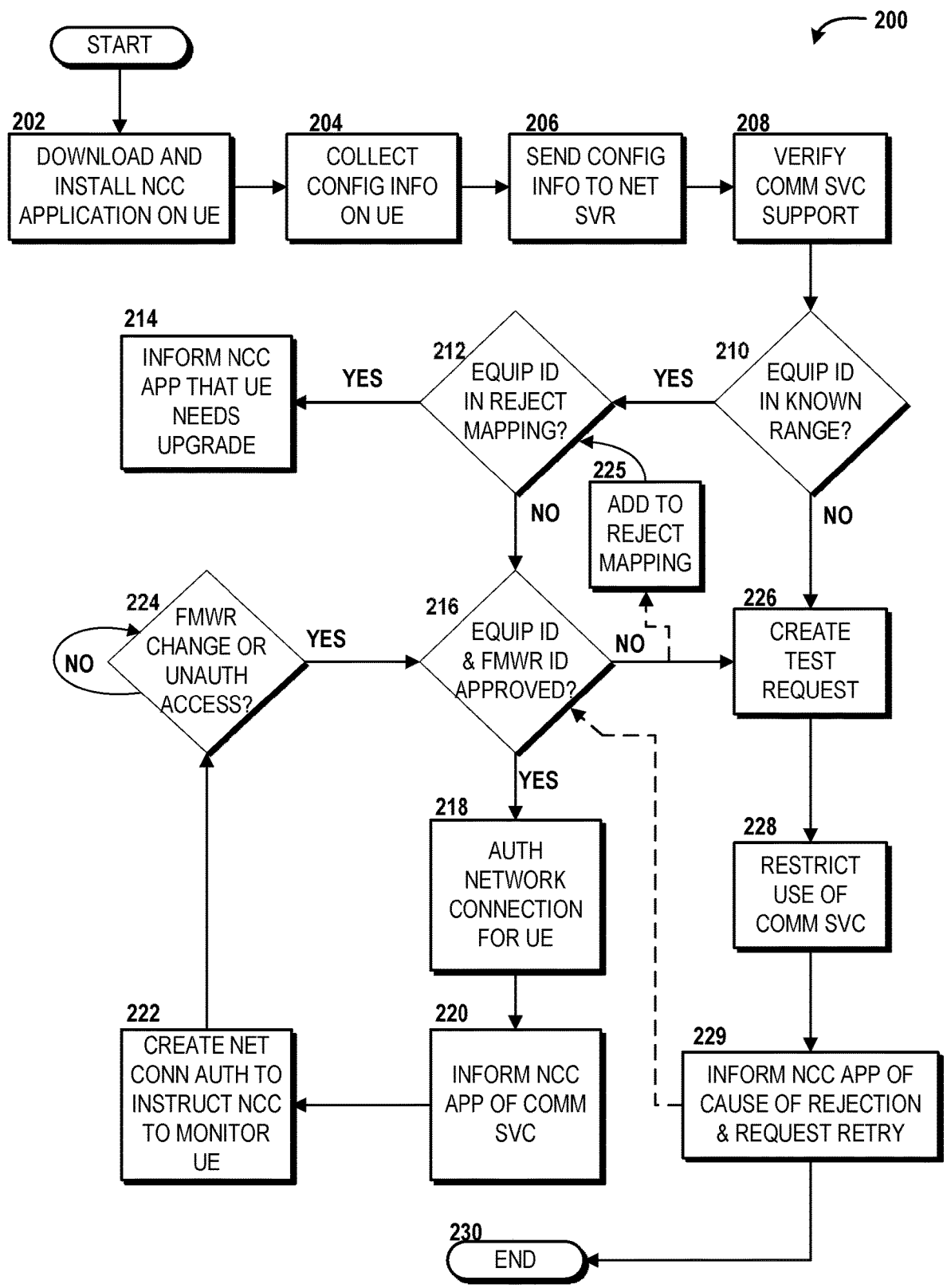
FIG. 2 is a flow diagram showing aspects of a method for providing remote user equipment assessment for network connection provisioning, according to an illustrative embodiment of the concepts and technologies described herein.

Turning now to FIG. 2, aspects of a method 200 for user equipment assessment for network connection provisioning will be described in detail, according to an illustrative embodiment. It should be understood that the operations of the method disclosed herein (e.g., the method 200) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the network server 112 and/or the UE 124, to perform one or more operations and/or causing the processor to direct other components of the computing system or device to perform one or more of the operations.

For purposes of illustrating and describing the concepts of the present disclosure, the methods disclosed herein are described as being performed by the network server 112 via execution of one or more software modules such as, for example, the EAA 118 that configure one or more processors. It should be understood that additional and/or alternative devices and/or network nodes can, in some embodiments, provide the functionality described herein via execution of one or more modules, applications, and/or other software including, but not limited to, the UE 124 executing the NCC 130. Thus, the illustrated embodiments are illustrative, and should not be viewed as being limiting in any way.

The method 200 begins at operation 202, where the UE 124 can access the download portal 109 to obtain the NCC 130 from the NCC instances 111 stored in the distribution datastore 110. The UE 124 can install the NCC 130 on the memory 128. In some embodiments, the NCC 130 can execute in the background of the UE 124. From operation 202, the method 200 can proceed to operation 204, where the NCC 130 executing on the UE 124 can collect the configuration information 148. The configuration information 148 can include the firmware identifier 140 and the equipment identifier 136. From operation 204, the method 200 can proceed to operation 206, where the NCC 130 can send the configuration information 148 to the network server 112. In some embodiments, the configuration information 148 can be sent to the network server 112 in a network connection request 146. From operation 206, the method 200 can proceed to operation 208, where the EAA 118 executing on the network server 112 can verify whether the UE 124 can support any, all, and/or a subset of services provided by the network 102, such as via the IP-based advanced services 104 that may, in some instances, be accessed via the evolved packet core network 103 within the network 102. To verify whether the UE 124 can support one or more IP-based advanced services 104, the method 200 can proceed to operation 210.

At operation 210, the EAA 118 can analyze the equipment identifier 136 and/or the firmware identifier 140 included in the configuration information 148. In some embodiments, the EAA 118 can determine whether the equipment identifier 136 is within a known range of equipment identifiers via use of the approved mapping 122. If the equipment identifier 136 can be identified within the approved mapping 122, then the EAA 118 can designate the equipment identifier 136 as being within a known range of equipment identifiers. In some embodiments, if the equipment identifier 136 is within the known range of equipment identifiers, then the method 200 can proceed to operation 212. If the equipment identifier 136 is not found within the approved mapping 122, then the method 200 can proceed to operation 226. For clarity, a discussion of operation 212 will be provided first, and then a discussion of operation 226 will be provided below.

At operation 212, the EAA 118 can determine whether the equipment identifier 136 is identified within the reject mapping 123 as being known to cause network faults and/or not support one or more communication services of the network 102, such as the IP-based advanced services 104 and/or the core communications services 105. In an embodiment, if the equipment identifier 136 is found to be present within the reject mapping 123, the method 200 can proceed from operation 212 to operation 214, where the EAA 118 can inform the NCC 130 that the UE 124 may need to be updated and/or upgraded before the UE 124 can be authorized to engage in one or more IP-based advanced services 104, such as but not limited to, Voice over LTE, WiFi calling, or the like. In an embodiment where the equipment identifier 136 is not found to be present within the reject mapping 123, the method 200 can proceed from operation 212 to operation 216.

At operation 216, the EAA 118 can use the approved mapping 122 to determine whether the UE 124 can support one or more services of the IP-based advanced services 104 when a particular instance of firmware is installed on the UE 124, such as the firmware 138. For example, if the EAA 118 determines that the combination of the equipment identifier 136 and the firmware identifier 140 maps to one or more approval to use services of the IP-based advanced services 104, then the method 200 can proceed from operation 216 to operation 218. However, if the EAA 118 determines that the approved mapping 122 does not identify the combination of the equipment identifier 136 and the firmware identifier 140 corresponding with an approval for the UE 124 to engage in one or more services of the IP-based advanced services 104, then the method 200 can proceed from operation 216 to operation 226. For clarity purposes, a discussion of operation 218 will be provided first, and then a discussion of operation 226 will be provided below.

At operation 218, the EAA 118 can authorize the UE 124 to engage in a network connection with the network 102, such as to engage in network communications via the core communications services 105. In some embodiments, the EAA 118 also can authorize the UE 124 to engage in at least one service of the IP-based advanced services 104. In some embodiments, the EAA 118 may prohibit the UE 124 from engaging or otherwise using one or more services of the IP-based advanced services 104 during a network connection with the network 102. From operation 218, the method 200 can proceed to operation 220, where the EAA 118 can inform the NCC 130 that the UE 124 has been authorized to communicate with the network 102. For example, in some embodiments, the EAA 118 can provide a network connection confirmation 150 to the NCC 130. The network connection confirmation 150 can include a user prompt 152 to inform the user 160 that connection to the network 102 has been authorized. In some embodiments, the user prompt 152 can indicate that the UE 124 has been authorized to engage in communication via the core communications services 105 and/or one or more services of the IP-based advanced services 104. In some embodiments the user prompt 152 can inform the user 160 that the UE 124 is not authorized to engage in functionality associated with one or more services of the IP-based advanced services 104, such as not being authorized to make WiFi calls or mobile tethering. In some embodiments, the EAA 118 can make changes to the user's billing profile to enable the use and charging of the approved and allowed network services (e.g., one or more of the core communications services 105 and/or any services of the IP-based advanced services 104). In some embodiments, the EAA 118 can inform the carrier provisioning system 158 to update or otherwise enable the use and charge of approved network services. In some embodiments, the EAA also can update other network entities (such as but not limited to, a Home Subscriber Server (HSS), a Home Location Register (HLR), and/or a carrier biller platform) to reflect a UE's capabilities and/or configuration (e.g., the capabilities and/or configuration of the UE 124) and facilitate access to, and use of, the various services of the network 102.

From operation 220, the method 200 can proceed to operation 222, where the EAA 118 can create the network connection authorization 154. In some embodiments, the network connection authorization 154 can be included in the network connection confirmation 150 and can be executed by the NCC 130. In some embodiments, the network connection authorization 154 can instruct the NCC 130 to monitor, on the UE 124, for one or more changes in the firmware currently installed on the UE 124, such as the firmware 138. In some embodiments, the network connection authorization 154 can instruct the NCC 130 to monitor, on the UE 124, for a user request (e.g., input from the user 160) to engage in one or more services of the IP-based advanced services 104 that the UE 124 of which the UE 124 is not authorized to engage. In some embodiments, the method 200 can continue from operation 222 to operation 224. At operation 224, the NCC 130 of the UE 124 can execute in monitor mode, where the NCC 130 can continuously and/or (a)periodically determine whether the firmware 138 on the UE 124 has been changed, altered, and/or updated, and can monitor for whether the UE 124 has received a request to access one or more services associated with the IP-based advanced services 104 which the UE 124 has not been authorized to use. If the NCC 130 does not detect a change in the firmware 138 and/or a request to access an unauthorized service (e.g., a service of the IP-based advanced services 104 of which the user was not subscribed), then the NCC 130 can continue monitoring. In an embodiment in which the NCC 130 detects a change in the firmware 138 (e.g., detecting that the updated firmware 142 is installed on the UE 124) on the UE 124, then the method 200 can proceed from operation 224 to operation 216. In an embodiment in which the NCC 130 detects a request to engage in unauthorized advanced services (e.g., the UE 124 attempting to engage in a WiFi service over the network 102 without having subscribed to the particular IP-based advanced services 104), then the NCC 130 can inform the EAA 118 of the attempt to access one or more advanced services so that the EAA 118 can control whether such actions should be allowed to continue. It is understood that the NCC 130 may not have the permissions to trigger a rejection of services by itself, but rather may interact with the EAA 118 in order to allow the EAA 118 to control the decisions being made and subsequent operations. From operation 224, the method 200 can proceed to operation 216. For clarity, a discussion of operation 216 will be provided first, followed by a discussion of the operation 226 and the operation 228.

In the embodiment in which operation 216 is preceded by operation 224 due to a change in firmware, the operation 216 can include the EAA 118 confirming whether the updated firmware 142 is approved for use on the UE 124, such as by verifying that the equipment identifier 136 and the updated firmware identifier 144 have been tested and correspond with being approved in the approved mapping 122. If the updated firmware identifier 144 and the equipment identifier 136 are approved for use based on the approved mapping 122, then the method 200 can proceed from operation 216 to operation 218, as discussed above. In an embodiment in which the updated firmware identifier 144 and the equipment identifier 136 are not indicated in the approved mapping 122 as being approved for use, the method 200 can proceed to operation 226. In some embodiments, before proceeding to operation 226, the method 200 can optionally include operation 225, where the EAA 118 can add or otherwise update the reject mapping 123 to include the combination of the updated firmware identifier 144 and the equipment identifier 136 that has not been approved for use, such as because no testing has yet been completed. In some embodiments, the EAA 118 may (a) periodically verify whether the rejection mapping 123 is current due to ongoing testing that may have occurred since the reject mapping 123 was last updated. For example, in some embodiments, the EAA 118 may confirm whether any combinations of firmware identifiers (and/or updated firmware identifiers) and equipment identifiers have been added to the approved mapping 122, and if so, the EAA 118 can remove the specific combination from the reject mapping 123. It is understood that the EAA 118 may perform this operation at any time, and does not necessarily have to update the rejection mapping 123 in response to a particular operation from the method 200. The method 200 can continue to operation 226.

At operation 226, the EAA 118 of the network server 112 can create a test request command 120. In an embodiment in which operation 226 is preceded by operation 210, then the EAA 118 can create the test request command 120 to instruct the testing server 156 to identify whether the equipment identifier 136 is associated with any known faults, errors, or other operating issues should the UE 124 connect to the network 102. In an embodiment in which operation 226 is preceded by operation 216, the EAA 118 can create the test request command 120 to instruct the testing server 156 to use the combination of the equipment identifier 136 and the firmware identifier (e.g., either the firmware identifier 140 and/or the updated firmware identifier 144) to check whether network faults would occur and/or whether services provided by the IP-based advanced services 104 could be supported using the provided combination. From operation 226, the method 200 can proceed to operation 228.

At operation 228, the EAA 118 can restrict the network from allowing the UE 124 to engage in one or more communication services on the network 102. For example, the EAA 118 can restrict the UE 124 from engaging in the one or more services provided by the IP-based advanced services 104. In some embodiments, restricting access to one or more communication services on the network 102 can be based on the one or more conditions. For example, the EAA 118 may restrict access to one or more communication services on the network 102 (e.g., the core communications services 105 and/or the IP-based advanced services 104) due to the NCC 130 being deleted from the UE 124, due to the firmware being changed on the UE 124, due to the UE 124 attempting to engage in one or more services of the IP-based advanced services 104, due to the combination of an equipment identifier and a firmware identifier not being tested to confirm whether network faults could occur, a combination thereof, or the like. In some embodiments, the EAA 118 can restrict the network 102 from allowing the UE 124 to engage in one or more communication services (e.g., the IP-based advanced services 104) by informing the carrier provisioning system 158 (or other network entity) of the equipment identifier 136 associated with the UE 124 so that the carrier provisioning system 158 can block a network connection from traversing the network 102 (which can, but may not always, include the evolved packet core network 103) to use the IP-based advanced services 104. From operation 228, the method 200 can proceed to operation 229. At operation 229, the EAA 118 can inform the NCC application 130 of a cause and/or reason as to why the network connection to engage in the particular communication service (e.g., one of the IP-based advanced services 104) was rejected, such as due to incompatible firmware and/or lack of subscription to the IP-based advanced services 104. In some embodiments, the EAA 118 can inform the user that they should attempt to reinstall an approved version of firmware that was previously installed on the UE (e.g., the firmware 138). In some embodiments, the testing server 156 may update the approved mapping 122 with new combinations using firmware that has been tested and is approved for use on various user equipment. In some embodiments, the EAA 118 can instruct the user to reattempt installation of the updated firmware 142 in order to check whether the combination of the updated firmware identifier 144 and the equipment identifier 136 has been approved. As such, in some embodiments, the method 200 can optionally proceed from operation 229 to operation 216, where the EAA 118 may (a) periodically check whether the updated firmware identifier 144 (or other firmware identifiers that have previously been rejected) has been approved for use. It is understood that the examples provided herein are for illustration purposes only, and therefore should not be construed as limiting in any way. From operation 228, the method 200 can proceed to operation 230, where the method 200 can end.

Figure 3:
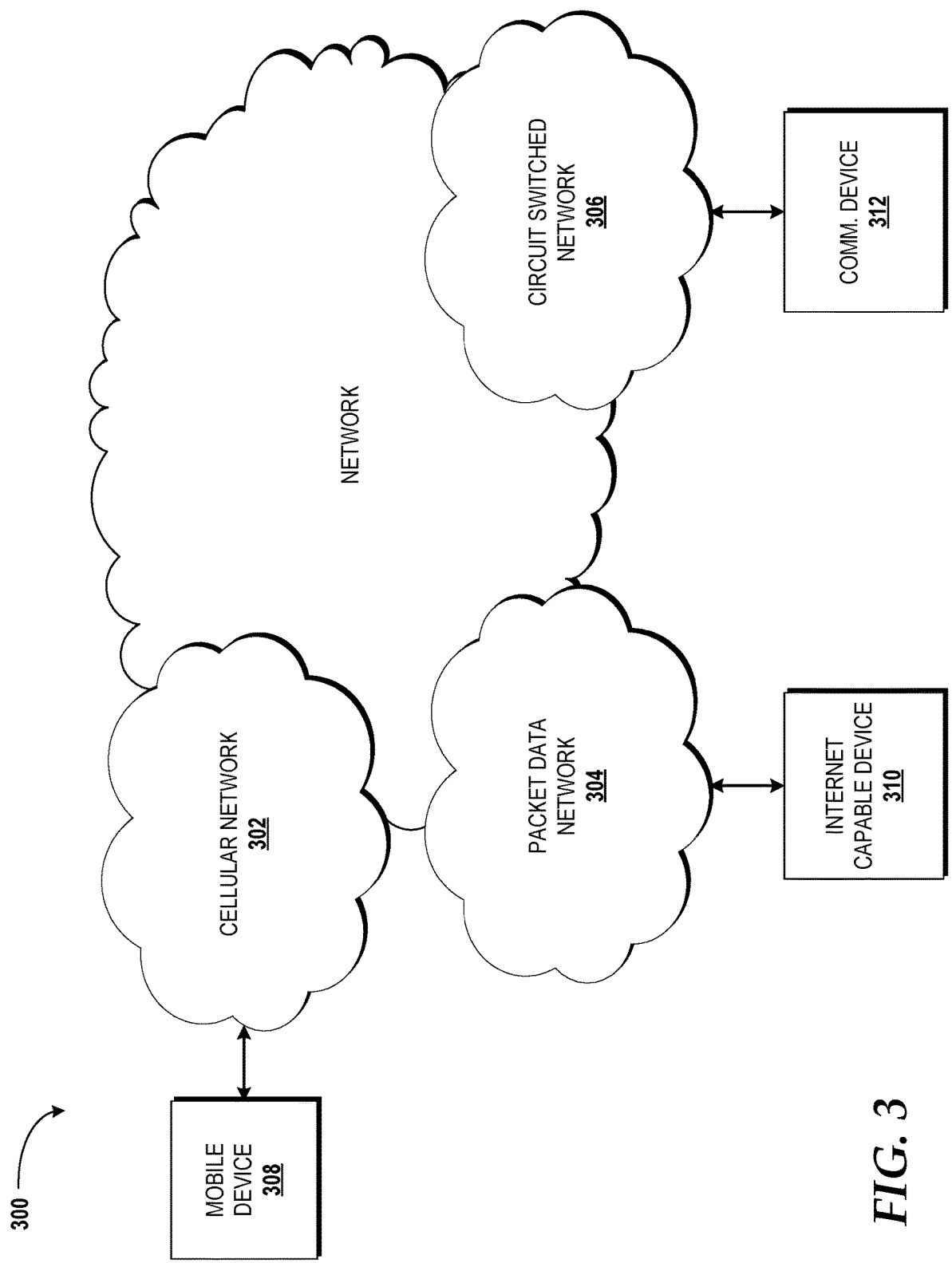
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 300 can include the network 102. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs, eNBs, gNBs, base station controllers ("BSCs"), radio network controllers ("RNCs"), mobile switching centers ("MSCs"), MMES, short message service centers ("SM-SCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306. In some embodiments, the evolved packet core network 103 of FIG. 1 can operate as the packet data network 304, and the core network 107 can operate in cooperation with the cellular network 302.

The mobile communications device 308, such as, for example, a cellular telephone, a mobile terminal, a PDA, a laptop computer, a handheld computer, and combinations thereof, can be operatively connected to the cellular network 302. In some embodiments, the UE 124 can be configured as the mobile communication device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G and 5G mobile communications standards such as LTE, or the like, as well as evolved and future mobile standards, including but not limited to LTE-Advanced, LTE-Advanced Pro and 5G.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the at least some of the network 102 can be configured as a packet data network, such as the packet data network 304. The circuit switched network 306 includes various hardware and software for providing circuit switched communications. The circuit switched network 306 may include, or may be, what is often referred to as a POTS. In some embodiments, the at least some of the network 102 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the network 102 can be performed by the cellular network 302, the packet data network 304, and/or the circuit switched network 306, alone or in combination with other networks, network elements, and the like, according at least to aspects of the features and operations discussed herein.

Figure 4:
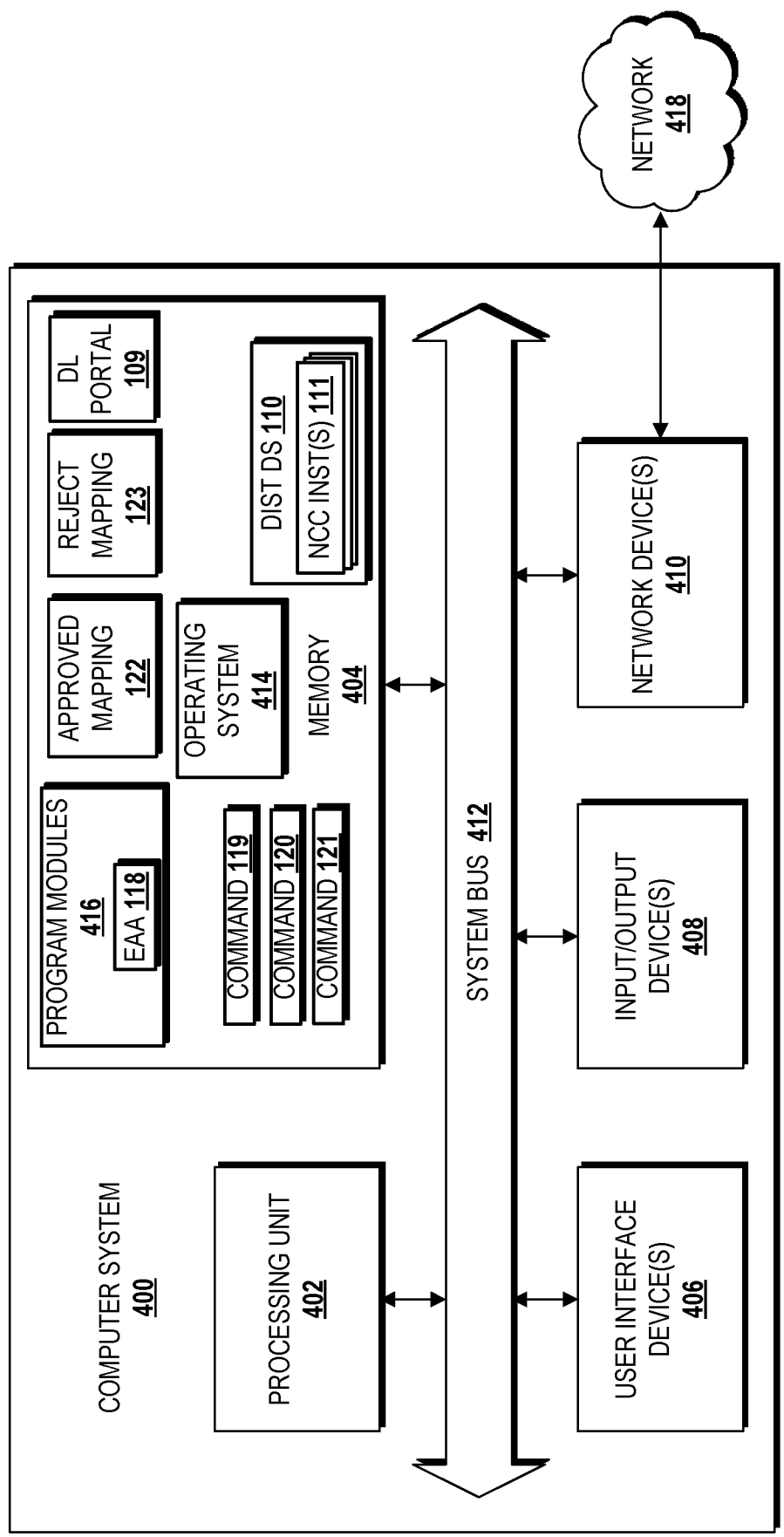
FIG. 4 is a block diagram illustrating an example computer system configured to provide, implement, and execute operations associated with remote user equipment assessment for network connection provisioning, according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the network server 112, the distribution server 108, the testing server 156, the carrier provisioning system 158, and/or the access point 106 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the EAA 118 and/or other program modules. These and/or other programs can be embodied in computer-readable media containing instructions that, when executed by the processing unit 402, in some embodiments, may perform and/or facilitate performance of one or more of the method 200 described in detail above with respect to FIG. 2. According to some embodiments, the program modules 416 may be embodied in hardware, software, firmware, or any combination thereof. In some embodiments, the memory 404 also can be configured to store the approved mapping 122, the reject mapping 123, the download portal 109, the commands 119-121, the distribution datastore 110, the NCC instances 111 and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 102. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
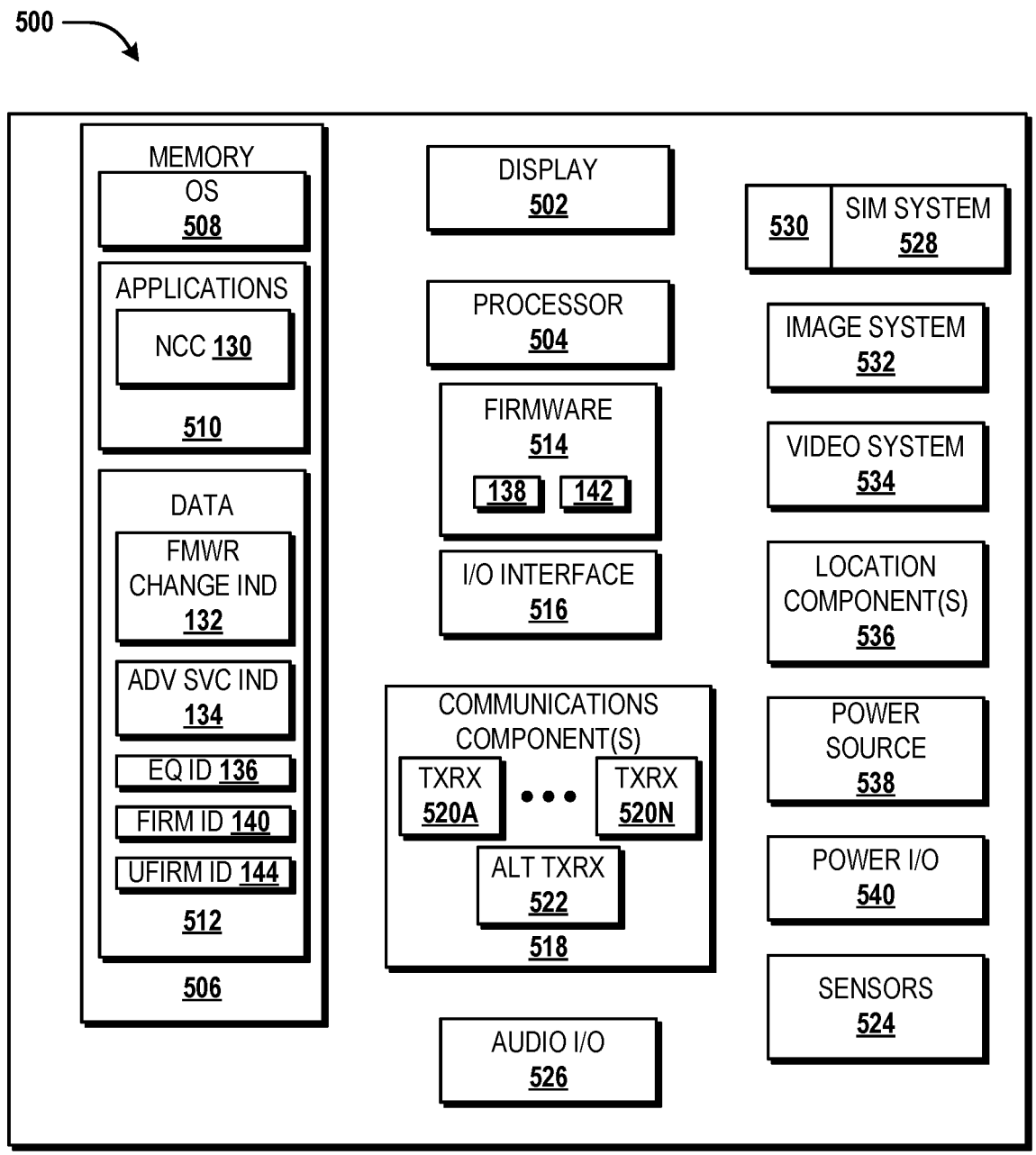
FIG. 5 is a block diagram illustrating an example user equipment capable of implementing aspects of the user equipment assessment according to embodiments of the concepts and technologies described herein.

Turning now to FIG. 5, an illustrative user equipment 500 and components thereof will be described. In some embodiments, one or more of the UE 124 (shown in FIG. 1) can be configured like the user equipment 500. It is understood that the user equipment 500 can be configured to take the form of a mobile communication device, a tablet, a wearable computing device, a heads-up display computer system, a vehicle computing system, an attachable computing device, a camera, an appliance (e.g., a refrigerator, an oven, a microwave, etc.), a television, a handheld device, a combination thereof, or other user equipment that can implement network communications. It is understood that the examples discussed above are used for illustration purposes only, and therefore should not be construed to limit the scope of the disclosure in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the user equipment 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The user equipment 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the user equipment 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting or otherwise entering/deleting data, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the user equipment 500. The data 512 can include, for example, one or more identifiers, and/or other applications or program modules. In some embodiments, the data 512 can include one or more of the firmware change indication 132, the advanced service indication 134, the equipment identifier 136, the firmware identifier 140, the updated firmware identifier 144, and/or other data sent among and/or between the UE 124 and the network server 112. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the NCC 130. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof. In some embodiments, the firmware 514 can include one or more of the firmware 138 and/or the updated firmware 142.

The user equipment 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the user equipment 500 can be configured to synchronize with another device to transfer content to and/or from the user equipment 500. In some embodiments, the user equipment 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the user equipment 500 and a network device or local device.

The user equipment 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the user equipment 500 may be provided by an audio I/O component 526. The audio I/O component 526 of the user equipment 500 can include one or more speakers for the output of audio signals, one or more microphones for the collection and/or input of audio signals, and/or other audio input and/or output devices.

The illustrated user equipment 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the user equipment 500 are contemplated, it should be understood that these embodiments are illustrative, and should not be construed as being limiting in any way.

The user equipment 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The user equipment 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The user equipment 500 also can include one or more location components 536. The location components 536 can be configured to send and/or receive signals to determine a geographic location of the user equipment 500. According to various embodiments, the location components 536 can send and/or receive signals from global positioning system ("GPS") devices, assisted GPS ("A-GPS") devices, WI-FI/ WIMAX and/or cellular network triangulation data, combinations thereof, and the like. The location component 536 also can be configured to communicate with the communications component 518 to retrieve triangulation data for determining a location of the user equipment 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the user equipment 500. Using the location component 536, the user equipment 500 can generate and/or receive data to identify its geographic location, or to transmit data used by other devices to determine the location of the user equipment 500. The location component 536 may include multiple components for determining the location and/or orientation of the user equipment 500.

The illustrated user equipment 500 also can include a power source 538. The power source 538 can include one or more batteries, power supplies, power cells, and/or other power subsystems including alternating current ("AC") and/ or direct current ("DC") power devices. The power source 538 also can interface with an external power system or charging equipment via a power I/O component 540. Because the user equipment 500 can include additional and/or alternative components, the above embodiment should be understood as being illustrative of one possible operating environment for various embodiments of the concepts and technologies described herein. The described embodiment of the user equipment 500 is illustrative, and should not be construed as being limiting in any way.

Based on the foregoing, it should be appreciated that concepts and technologies directed to remote user equiptment assessment for network connection provisioning have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
 a processor; and
 a memory that stores computer-executable instructions that, in response to execution by the processor, cause the processor to perform operations comprising:
  providing a network connection client to a distribution datastore,
  informing a user equipment that requests to engage in a service provided by a communication network provider to obtain a copy of the network connection client from the distribution datastore, wherein the network connection client, when installed, executes in the background of the user equipment,
  receiving, from the network connection client executing on the user equipment, a network connection request to authorize connection to a network associated with the communication network provider, wherein the communication network provider provides access to at least one core communications service and at least one internet protocol-based advanced service via the network,
determining whether the user equipment can support communication via the at least one core communications service and the at least one internet protocol-based advanced service provided by the communication network provider of the network, and
in response to determining that the user equipment can support communication via the at least one core communications service and the at least one internet protocol-based advanced service provided by the communication network provider of the network, authorizing a network connection with the at least one core communications service for the user equipment while prohibiting the user equipment from using the at least one internet protocol-based advanced service during the network connection.

2. The system of claim 1, wherein the operations further comprise:
providing, to a user interface of the user equipment via the network connection client, a network connection confirmation that includes a user prompt to inform a user that connection to the network to use the at least one core communications service has been authorized without functionality of the at least one internet protocol-based advanced service; and
creating a network connection authorization that instructs the network connection client to monitor for a change in firmware associated with the user equipment and monitor for a user request to engage in the at least one internet protocol-based advanced service via the network.

3. The system of claim 2, wherein the operations further comprise:
receiving, from the network connection client, an indication of a change in the firmware associated with the user equipment;
determining whether the change in the firmware is approved to support connection with the network; and
creating, based on determining whether the change in the firmware is approved to support connection with the network, one of a command to authorize continued connection of the user equipment or a command to create a test request.

4. The system of claim 2, wherein the operations further comprise:
receiving, from the network connection client, an indication of the user request to engage in the at least one internet protocol-based advanced service via the network; and
restricting the network from allowing the user equipment to engage in the at least one internet protocol-based advanced service.

5. The system of claim 1, wherein the network connection request comprises configuration information associated with the user equipment that is collected by the network connection client executing on the user equipment, and wherein the configuration information of the network connection request comprises a firmware identifier and an equipment identifier associated with the user equipment.

6. The system of claim 5, wherein determining whether the user equipment can support communication via the at least one internet protocol-based advanced service of the network is based on the configuration information.

7. A method comprising:
providing, by a server, a network connection client to a distribution datastore;
informing, by the server, a user equipment that requests to engage in a service provided by a communication network provider to obtain a copy of the network connection client from the distribution datastore, wherein the network connection client, when installed, executes in the background of the user equipment;
receiving, by the server from the network connection client executing on the user equipment, a network connection request to authorize connection to a network associated with the communication network provider, wherein the communication network provider provides access to at least one core communications service and at least one internet protocol-based advanced service via the network;
determining, by the server, whether the user equipment can support communication via the at least one core communications service and the at least one internet protocol-based advanced service provided by the communication network provider of the network; and
in response to determining that the user equipment can support communication via the at least one core communications service and the at least one internet protocol-based advanced service provided by the communication network provider of the network, authorizing, by the server, a network connection with the at least one core communications service for the user equipment while prohibiting the user equipment from using the at least one internet protocol-based advanced service during the network connection.

8. The method of claim 7, further comprising:
providing, by the server to a user interface of the user equipment via the network connection client, a network connection confirmation that includes a user prompt to inform a user that connection to the network to use the at least one core communications service has been authorized without functionality of the at least one internet protocol-based advanced service; and
creating a network connection authorization that instructs the network connection client to monitor for a change in firmware associated with the user equipment and monitor for a user request to engage in the at least one internet protocol-based advanced service via the network.

9. The method of claim 8, further comprising:
receiving, by the server from the network connection client, an indication of a change in the firmware associated with the user equipment;
determining, by the server, whether the change in the firmware is approved to support connection with the network; and
creating, by the server based on determining whether the change in firmware is approved to support connection with the network, one of a command to authorize continued connection of the user equipment or a command to create a test request based on determining whether the change in the firmware is approved to support connection with the network.

10. The method of claim 8, further comprising:
receiving, by the server from the network connection client, an indication of the user request to engage in the at least one internet protocol-based advanced service via the network; and restricting, by the server, the network from allowing the user equipment to engage in the at least one internet protocol-based advanced service.

11. The method of claim 7, wherein the network connection request comprises configuration information associated with the user equipment that is collected by the network connection client executing on the user equipment, and wherein the configuration information of the network connection request comprises a firmware identifier and an equipment identifier associated with the user equipment.

12. The method of claim 11, wherein determining whether the user equipment can support communication via the at least one internet protocol-based advanced service of the network is based on the configuration information.

13. A computer storage medium having computer-executable instructions stored thereon that, in response to execution by a processor of a system, cause the processor to perform operations comprising:
providing a network connection client to a distribution datastore;
informing a user equipment that requests to engage in a service provided by a communication network provider to obtain a copy of the network connection client from the distribution datastore, wherein the network connection client, when installed, executes in the background of the user equipment;
receiving, from the network connection client executing on the user equipment, a network connection request to authorize connection to a network associated with the communication network provider, wherein the communication network provider provides access to at least one core communications service and at least one internet protocol-based advanced service via the network;
determining whether the user equipment can support communication via the at least one core communications service and the at least one internet protocol-based advanced service provided by the communication network provider of the network; and
in response to determining that the user equipment can support communication via the at least one core communications service and the at least one internet protocol-based advanced service provided by the communication network provider of the network, authorizing a network connection with the at least one core communications service for the user equipment while prohibiting the user equipment from using the at least one internet protocol-based advanced service during the network connection.

14. The computer storage medium of claim 13, wherein the operations further comprise:
providing, to a user interface of the user equipment via the network connection client, a network connection confirmation that includes a user prompt to inform a user that connection to the network to use the at least one core communications service has been authorized without functionality of the at least one internet protocol-based advanced service; and
creating a network connection authorization that instructs the network connection client to monitor for a change in firmware associated with the user equipment and monitor for a user request to engage in the at least one internet protocol-based advanced service via the network.

15. The computer storage medium of claim 14, wherein the operations further comprise:
receiving, from the network connection client, an indication of a change in the firmware associated with the user equipment;
determining whether the change in the firmware is approved to support connection with the network; and
creating, based on determining whether the change in the firmware is approved to support connection with the network, one of a command to authorize continued connection of the user equipment or a command to create a test request.

16. The computer storage medium of claim 14, wherein the operations further comprise:
receiving, from the network connection client, an indication of the user request to engage in the at least one internet protocol-based advanced service via the network; and
restricting the network from allowing the user equipment to engage in the at least one internet protocol-based advanced service.

17. The computer storage medium of claim 13, wherein the network connection request comprises configuration information associated with the user equipment that is collected by the network connection client executing on the user equipment, and wherein the configuration information of the network connection request comprises a firmware identifier and an equipment identifier associated with the user equipment.

18. The computer storage medium of claim 17, wherein determining whether the user equipment can support communication via the at least one internet protocol-based advanced service of the network is based on the configuration information.

\* \* \* \* \*